United States Patent [19]

Spaulding et al.

[11] Patent Number: 4,900,199

[45] Date of Patent: Feb. 13, 1990

[54] HIGH PRESSURE POWER FEED SYSTEM

[75] Inventors: Mark F. Spaulding, Rockville Centre; Richard A. Goehring, Huntington Station, both of N.Y.

[73] Assignee: The Perkin-Elmer Corporation, Norwalk, Conn.

[21] Appl. No.: 260,625

[22] Filed: Oct. 21, 1988

[51] Int. Cl.[4] ............................................. B65G 53/66

[52] U.S. Cl. ......................................... 406/14; 406/30; 406/121; 406/123

[58] Field of Search .................................. 406/14–17, 406/50, 30, 121, 122, 127, 129, 133, 134, 145, 146, 118; 239/85

[56] References Cited

U.S. PATENT DOCUMENTS

| | | | |
|---|---|---|---|
| 2,623,793 | 12/1952 | Hill | 406/30 |
| 3,291,536 | 12/1966 | Smoot | 406/14 |
| 3,365,242 | 1/1968 | Metz et al. | 406/14 |
| 3,432,208 | 3/1969 | Hill et al. | 406/93 |
| 3,501,097 | 3/1970 | Daley | 239/85 |
| 3,976,332 | 8/1976 | Fabel | 406/14 |
| 4,284,032 | 8/1981 | Moos et al. | 406/14 |
| 4,381,898 | 5/1983 | Rotolico et al. | 406/14 |
| 4,561,808 | 12/1931 | Spaulding et al. | 406/118 |
| 4,582,254 | 4/1986 | Rotolico et al. | 406/121 |
| 4,613,259 | 9/1986 | Packer et al. | 406/30 |
| 4,740,112 | 4/1988 | Muehlberger et al. | 406/50 |
| 4,743,143 | 5/1988 | Nagasaka | 406/14 |
| 4,747,731 | 5/1988 | Nagasaka et al. | 406/14 |
| 4,758,117 | 7/1988 | Maki et al. | 406/123 |

FOREIGN PATENT DOCUMENTS

| | | | |
|---|---|---|---|
| 107316 | 12/1980 | Japan | 406/14 |
| 63-12524 | 1/1988 | Japan | 406/127 |

*Primary Examiner*—Sherman D. Basinger
*Assistant Examiner*—Stephen P. Avila
*Attorney, Agent, or Firm*—H. S. Ingham; E. T. Grimes

[57] ABSTRACT

A system for feeding powder into high backpressure includes a carrier gas conduit with an orifice for entraining powder from a hopper, and a line for discharging feed gas at regulated pressure into the hopper to effect entrainment. A gas bleeder line has an outlet connection to the output carrier conduit, with a line pressure representative of carrier pressure. A differential pressure regulator equal to carrier pressure plus an increment. A regulated relief valve in the input carrier gas conduit provides a bleed gas supply to the bleeder line at a pressure equal to carrier pressure plus an increment. Pinch valves in the carrier conduit allow or prevent powder entrainment; alternatively, a rotatable sleeve is on the carrier conduit with a side opening alignable with the entrainment orifice. A carrier bypass conduit may be connected between the input conduit and the output conduit and hopper pressurization line may be connected between the output conduit and the hopper. An optional exhaust system may replace the bypass and pressurization lines and includes a differential exhaust valve to exahaust gas from the hopper when hopper pressure exceeds feed gas pressure.

30 Claims, 7 Drawing Sheets

HIGH PRESSURE POWER FEED SYSTEM

The present invention relates to powder feeding and particularly to a powder feeding system for feeding into a high back pressure.

BACKGROUND OF THE INVENTION

Thermal spraying involves the heat-softening of the heat-fusible material, such as a metal or ceramic and the propelling of the softened material in particulate form against a surface to be coated to which the heat-fusible material bonds. A thermal spray gun is usually used for this purpose and with one type, the heat-fusible material is supplied in powder form to the gun. The powder is of quite small particle size, e.g. below about 150 microns (100 mesh U.S. Standard screen size) and as small as one micron, and is difficult to meter and control. Typically a thermal spray powder is −100 +325 mesh (−149 +44 microns) or −44 microns +15 microns.

A thermal spray gun normally utilizes a combustion flame or a plasma flame to effect melting of the powder, but other heating means, such as electric arcs, resistance heaters or induction heaters can also be used, alone or in combination. In a powder-type combustion flame spray gun, the carrier gas for the powder can be one of the combustion gases or compressed air. In a plasma flame spray gun the carrier gas is generally the same as the primary plasma gas, although other gases such as hydrocarbon are used in special cases.

To obtain high quality coatings, it is necessary to accurately control the rate of the powder fed through the gun and to maintain the same constant for a given set of spray conditions. The type of fine powder used is a very difficult material to handle and to feed with any uniformity into a carrier gas.

Various feeding systems have been devised which involve pressure regulation, fluidization and feedback principles in the control of powder feed rate, replacing mechanical conveyance which subjects components to severe wear and attendant loss of rate control. For example, U.S. Pat. No. 3,501,097 (Daley) discloses a mechanical feed device. In FIG. 7 thereof such a device is shown that utilizes differential pressure between the feeder and the carrier gas conduit to regulate the drive motor for the mechanical feeder. In FIG. 8 thereof a pressure regulator injecting carrier gas into a powder chamber replaces mechanical feed and preset pressure regulates feed rate.

Feeders with powder fluidization are typified by U.S. Pat. No. 3,976,332 (Fabel) which discloses a feeder utilizing a fluidic amplifier, and U.S. Pat. No. 4,561,808 (Spaulding et al) which involves a simple pressure regulator. In each of these patents, control of a feed gas separately from the carrier gas is used to control feed rate. Under the operating principle of these patents, for example with a pressure regulator, feed gas pressure is set at a constant level slightly above atmospheric pressure independent of carrier gas pressure. Pressure to the feeder from the powder-carrier gas conduit is proportional to powder feed rate in the carrier conduit. A rise in feed rate decreases the differential between the feed gas pressure and the carrier gas pressure, resulting in a compensating decrease in feed rate. These references thus teach regulation of feed rate via pressure feedback.

A similar concept is disclosed in U.S. Pat. No. 2,623,793 (W. H. Hill) in which pressure differential is detected between the input and output portions of a lift pipe for conveying subdivided solids. The pressure differential is translated to operation of a mechanical valve for a feed gas. U.S. Pat. No. 3,599,832 (Smith) teaches such pressure differential to mechanically control a valve in the powder-carrier conduit.

U.S. Pat. No. 3,365,242 (Metz) similarly involves several flows including a carrier gas and a fluidizing gas. The latter is returned through a bleeder line from the top of the hopper to the powder-carrier line. More generally, feed gas may be introduced above the powder (as in Fabel), below the powder (as in Spaulding), or through a tube from the top as disclosed in German Pat. No. G8417749.7.

U.S. Pat. No. 4,747,731 (Nagasaka et al) is more complex, with differential pressure taps in the carrier passage operating a control valve for adding gas downstream to the carrier gas, to increase degree of vacuum for drawing in powder from an open hopper. A gas operated pinch valve is separately operated to turn powder feed on and off.

Variations of systems for bypassing carrier gas around the feeder are known. U.S. Pat. No. 3,291,536 (Smoot) discloses a bypass and several pinch valves operated from pressure switches sensitive to input pressure of the carrier gas, to bypass the feeder and blow out slugs from the carrier line when backpressure develops from powder slugs in the line. U.S. Pat. No. 3,432,208 (J. A. F. Hill et al) shows a bypass line for adding carrier gas in a system with manually operated valves, for feeding into a high pressure wind tunnel. U.S. Pat. No. 4,740,112 (Muehlberger et al) discloses bypassing of the feeder by the carrier gas when a mechanically driven feeder is turned off. By reference therein the Muehlberger system is directed to feeding into low pressure plasma spraying chambers.

The aforementioned references are at least implicitly directed to feeding powder in a carrier gas to a utilization device such as a conventional thermal spray gun that produces little or no significant changes in backpressure, except Smoot which addresses pressure surges due to slugs in the line (and bypasses the feeder to blow out the slugs). The feeders of Fabel and Spaulding may stop feeding completely if there is a high backpressure, since the differential pressure of the feed gas will go to zero (or even reverse). Non-mechanical, fluidized powder types of feeders have otherwise been quite successful for feeding powder to thermal spray guns having relatively low backpressure (relative to atmospheric), including a plasma spray gun having external powder injection.

However, internal injection plasma guns with significant backpressure generally continue to require feeders with mechanical metering. A further problem has evolved with the commercial development of high velocity combustion spray thermal spray guns such as a Metco Type DJ Gun produced by The Perkin-Elmer Corporation and disclosed in copending U.S. patent application Ser. No. 193,030 filed May 11, 1988 (Rotolico et al) [Attorney Docket No. ME-3818] assigned to the present assignee. These guns develop substantial changes in backpressure from essentially atmospheric to 50 to 60 psig or more and, furthermore, the backpressure depends on exact gun conditions and is not predictable for presetting the powder feeder gas pressures. Also, since the backpressure is nearly zero before lightup of the gun, with prior art feeders, there can be time delays for the feeder pressures and feed rates to adapt when the gun is lit.

SUMMARY OF THE INVENTION

Therefore an object of the present invention is to provide an improved powder feeding system useful for feeding powder to a utilization device such as a thermal spray gun susceptible of producing substantial changes in backpressure to the feeding system. Further objects are to provide a powder feeding system for internal feed in a plasma spray gun and for use with a high velocity combustion flame spray gun. Another object is to provide an improved powder feeding system for high pressure feeding without the need for mechanical metering of powder feed rate.

The foregoing and other objects are achieved with a powder feeding system comprising an enclosed hopper for a powder, carrier conduit means for conveying the powder in a carrier gas stream from a powder entrainment location in the hopper to a powder utilization device, and entrainment means for discharging a feed gas into the hopper at a regulated pressure such as to effect entrainment of the powder into the carrier gas stream at the entrainment location at a feed rate responsive to the regulated pressure. The system further comprises hopper pressure means for pressurizing the hopper before feeding powder and for exhausting the hopper after feeding powder, detection means for detecting carrier gas pressure in the carrier conduit means, and feed regulator means responsive to the carrier gas pressure for effecting the regulated pressure equal to the carrier gas pressure increased by a selected feed pressure increment. Preferably the feed regulator means is a differential pressure regulator having a reference pressure inlet in gas pressure communication with the carrier conduit means.

The carrier conduit means includes an input conduit receptive of a carrier gas supply and extending to the entrainment location, and an output conduit extending from the entrainment location to the point of powder utilization. To prevent powder backup into gas regulators the detection means comprises a gas bleeder line having a constricted flow input and having an outlet connection to the output conduit such as to provide a continuous bleeding of gas through the bleeder line to the output section. The bleeder line thus has a line pressure representative of the carrier gas pressure in the output conduit, and the regulator means is responsive to the line pressure for effecting the regulated pressure.

A bleed gas supply to the constricted flow input at a bleed supply pressure is made to be equal to carrier gas pressure in the input conduit increased by a selected bleed pressure increment. In a preferred embodiment, the bleed supply means comprises a gas input line between the carrier gas supply and the input conduit, and a regulated relief valve disposed between the input line and the input conduit such as to provide the bleed supply pressure in the input line.

Valve means are associated with the entrainment location, having an open position for allowing the powder entrainment and a closed position for preventing the powder entrainment. In one embodiment the valve means comprises a first carrier gas shutoff valve disposed in the input conduit proximate the entrainment location, a second carrier gas shutoff valve disposed in the output conduit proximate the entrainment location, a carrier bypass conduit connected between the input conduit and the output conduit, and a bypass shutoff valve disposed in the bypass conduit. Valve control means to selectively open and close the shutoff valves such that the first and second carrier gas shutoff valves are opened and closed jointly and the bypass shutoff valve is open when the carrier gas shutoff valves are closed and the bypass shutoff valve is closed when the carrier gas shutoff valves are open. The shutoff valves, for example, each comprise an elastomer pinch valve operated by valve gas pressure from a respective valve pressure source.

The hopper pressure means may comprise a hopper pressurization line connected between the output conduit and the hopper above a maximum powder level therein, and a pressurization shutoff valve is disposed in the pressurization line. The valve control means further selectively opens the pressurization shutoff valve when the bypass shutoff valve is open and closes the pressurization shutoff valve when the bypass shutoff valve is closed. As an alternative to the pressurization line, there may be exhaust means for exhausting gas from the hopper when powder feeding is terminated.

A feed gas line is disposed between the regulator means and the hopper, and a first gas shutoff valve is disposed in the feed gas line. In a preferred embodiment, the exhaust means comprises a check valve disposed in the feed gas line between the shutoff valve and the hopper for impeding gas flow from the hopper through the feed gas line, pressure relief means disposed between the shutoff valve and the check valve for relieving pressure from the feed gas line when the first shutoff valve is closed, and a differential exhaust valve responsive of hopper pressure and of feed gas pressure in the feed gas line at a pressure tap located between the check valve and the first shutoff valve. Gas is exhausted from the hopper through the differential exhaust valves when hopper pressure exceeds the feed gas pressure.

In yet another embodiment, the valve means comprises closure means for selectively closing off the carrier conduit from entraining powder from the hopper at the entrainment location. The closure means comprises a rotatable sleeve disposed on the carrier conduit at a powder entrainment location in the powder conduit, and there are means for rotating the sleeve on the powder conduit. The sleeve has a side opening therein alignable with the entrainment orifice in an open position and rotatable to a non-aligned closed position.

DETAILED DESCRIPTION OF THE INVENTION

Figure 1:
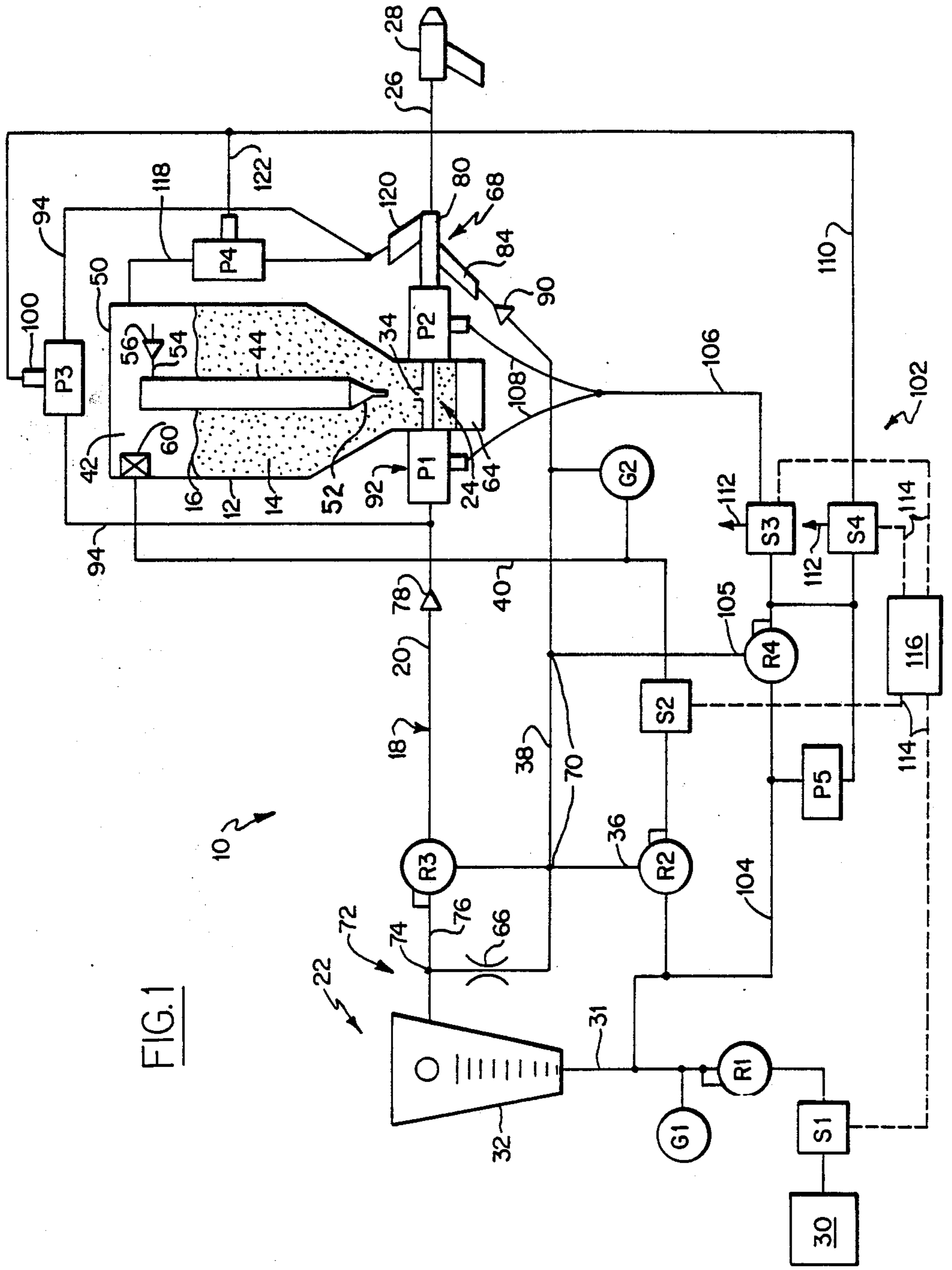
FIG. 1 is a schematic diagram of a first embodiment of a powder feeding system according to the present invention.

With reference to FIG. 1 a powder feeding system 10 includes an enclosed hopper 12 containing a powder 14 up to a normal maximum level 16. A carrier conduit 18 for conveying the powder in a carrier gas stream comprises an input conduit 20 receptive of a carrier gas supply 22 and extending to an entrainment location 24 in the bottom of the hopper. The carrier conduit further comprises an output conduit 26 extending from the entrainment location to a powder utilization device such as a high pressure type of high velocity thermal spray gun 28. Carrier gas supply 22 conventionally comprises a source 30 of compressed air, nitrogen, argon or the like as required for end point utilization, a first solenoid valve S1, a high pressure regulator R1, a pressure gauge G1, gas line 31 and a gas flow meter 32. A pinch valve (not shown) may be inserted in conduit 26 near gun 28 to prevent backflow of combustible gases from the gun when the carrier flow is off.

Entrainment of powder into carrier conduit 18 at entrainment location 24 is effected through at least one intake orifice 34 in the conduit, for example a 1.02 mm orifice in a 1.07 mm inside diameter carrier conduit. Entrainment occurs with the discharging of a feed gas into hopper 12 at a regulated pressure such as to cause entrainment of the powder into the carrier gas stream through orifice 34 at a feed rate responsive to the regulated pressure. A feed regulator such as a differential pressure regulator R2 is receptive of pressurized gas tapped from supply line 31. The regulator has a reference pressure inlet 36 in gas pressure communication with the carrier conduit by way of a gas bleeder line 38 which detects carrier gas pressure. A feed gas line 40 connects the output of the regulator to hopper 12 with a second gas shutoff valve such as a solenoid valve S2 disposed in the feed gas line.

Preferably the feed gas line leads to the upper part of the hopper 42 above the maximum powder level 16. Optionally the feed gas simply is allowed to diffuse through the powder to a locally fluidized powder zone adjacent the intake orifice.

Figure 2:
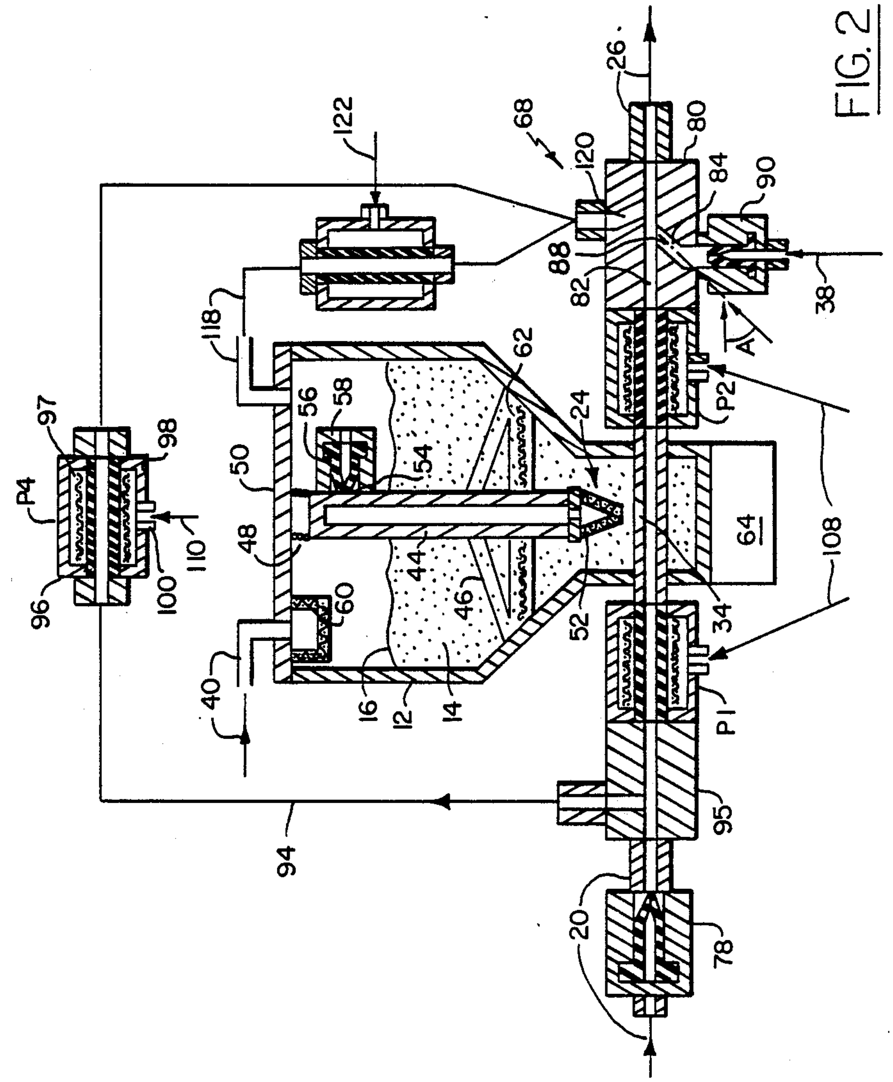
FIG. 2 is an elevation in cross-section of certain components of the system of FIG. 1.

More preferably, however, and with reference to FIG. 2, the entrainment system means also comprises a vertical tube 44 mounted on a support plug 46 and held with a retaining spring 48 under a hopper cover 50 (removably sealed to the hopper in the usual manner) such that tube 44 extends from above maximum powder level 16 in the hopper to a point proximate the powder entrainment location 24. A screen 52, for example a 40 micron screen, is mounted on the bottom of tube 44 to diffuse gas into the powder from the tube. The tube further has an intake port 54 therein above the maximum powder level receptive of feed gas from the hopper. A rubber or other elastomer duckbill valve 56 or the like is disposed in a valve body 58 at intake port 54 to prevent gas from flowing back into the tube so as to clog screen 52.

A further blocking screen 60 prevents powder from backing into the feed gas line. A large mesh screen 62 such as 20 mesh (841 microns) capable of passing all of the desired powder except lumps and other large contaminants is disposed near the lower part of the hopper and also functions to help disperse powder into the bottom. A conventional air or electrically driven vibrator 64 is mounted under the bottom of the hopper.

Differential regulator R2 (FIG. 1), is of the conventional type, such as Model 11-118 sold by Norgren, modified for differential pressure regulation, or as shown in aforementioned U.S. Pat. No. 4,747,731. Regulator R2 follows the carrier gas pressure via line 38 for effecting the regulated pressure or line 40. The regulator is adjustable so as to provide the regulated pressure equal to the carrier gas pressure increased by a selected feed pressure increment. This arrangement effects a feed pressure operating at the pressure increment above the carrier pressure regardless of the backpressure from the thermal spray gun or other utilization.

Preferably gas bleeder line 38 has a constricted flow input 66 and an outlet connection 68 to output conduit 26 such as to provide a continuous bleeding of gas through the bleeder line. Line pressure is taken at pressure points 70 in the gas bleeder line, and the line pressure is representative of the carrier gas pressure in the output conduit. A bleed supply 72 from input conduit 20 provides a bleed gas supply at a bleed supply pressure equal to the carrier gas pressure in the input conduit increased by a selected bleed pressure increment. The bleed supply preferably comprises a regulated relief valve R3 such as Model VO6 sold by Norgren and modified for differential pressure regulation, which is disposed in an input line between carrier gas supply 22 and input conduit 20 such as to provide the bleed supply pressure at a tap location 74 in an input line 76 connecting carrier supply 22 to relief valve R3. The constricted flow input is connected to the tap location. Constrictor 66, for example, consists of a 3 cm long tube with a 0.15 mm inside diameter. A powder blocker such as an elastomer duckbill check valve 78 should be placed in input conduit 20 to prevent powder from backing up into regulator R3.

Outlet connection 68 comprises a merger fitting 80 (FIG. 2) having a first conduit 82 therein constituting a portion of output conduit 26. A second conduit 84 therein has a first end receptive of the bleed gas from bleeder line 38 and a second end 88 merged into first conduit 82 at an acute angle A with respect to the direction of carrier gas flow in first conduit 82. The acute angle is, e.g., about 30° to minimize entry of powder into bleeder line 38. Further powder blocking means such an elastomer duckbill valve 90 should also be placed in the bleeder line near outlet connection 68.

A differential pressure gauge G2 (FIG. 1) is connected between feed gas line 40 and bleeder line 38. This pressure gauge is responsive of hopper pressure and the line pressure for providing a measure of powder feed rate.

Valve means 92 is associated with entrainment location 24, having an open position for allowing powder entrainment into the carrier conduit from the hopper and a closed position for preventing the powder entrainment. According to the embodiment of the present invention, shown in FIGS. 1 and 2, the valve means comprises a first carrier gas shutoff valve P1 disposed in input conduit 20, preferably proximate the entrainment location, and a second carrier gas shutoff valve P2 disposed in the output conduit, also preferably proximate the entrainment location. A carrier bypass conduit 94 is connected between a fitting 95 on input conduit 20 and the output conduit so as to bypass hopper 12 and shutoff valves P1, P2. A bypass shutoff valve P3 is disposed in the bypass conduit. Preferably each of the shutoff valves P1,P2,P3 comprises an elastomer pinch valve operated by valve gas pressure from a respective valve pressure source. Each pinch valve (detailed for P3 in FIG. 2) is an elastomer tube 96 connected within a stabilizing screen 97 in its respective gas line and enclosed in a jacket 98 receptive of valve pressure via a port 100 Upon application of valve pressure to the jacket the valve is pinched into a shutoff position.

Valve controls 102 selectively open and close shutoff valves P1,P2,P3 such that the first and second carrier gas shutoff valves P1,P2 are opened and closed jointly, and bypass shutoff valve P3 is open when carrier gas shutoff valves P1,P2 are closed and bypass shutoff valve P3 is closed when carrier gas shutoff valves P1,P2 are open.

The valve pressure source includes a valve pressure regulator preferably comprising a differential pressure regulator R4, similar to regulator R2, receptive of supply gas on a gas line 104 tapped from carrier gas supply line 31. Regulator R4 has a pressure inlet 105 connected from gas bleeder line 38 so as to be responsive to the carrier gas pressure. The regulator is set to provide the valve pressure at a level that is equal to the carrier gas pressure increased by a selected valve pressure increment sufficient to operate the shutoff valves, i.e. pinch the elastomer tubes, regardless of the pressure in the carrier conduit or the bypass.

A first solenoid valve S3 is disposed in a gas line 106 connected between differential regulator R4 and a divided line 108 to each of the first and second pinch valves P1,P2. A second solenoid S4 is disposed in another gas line 110 from regulator R4 to bypass pinch valve P3. Solenoid valves S3,S4 are of the type with relief ports 112 that exhaust their respective outputs to atmosphere when closing off pressure to respective lines 108,110 from the differential regulator. Control signals on electrical conductors 114 from a control console 116 or computer or the like operate all solenoids selectively to apply the valve gas pressure to the shutoff valves.

Hopper pressure means are provided for pressurizing the hopper before feeding powder and exhausting the hopper after feeding powder. According to the embodiment of FIGS. 1 and 2, the hopper pressure means comprises a hopper pressurization line 118 which is connected between output conduit 26 and hopper 12 above maximum powder level 16 therein. Preferably the connection to the output conduit is via a second merger duct 120 also at an acute angle at merger fitting 80. A pressurization shutoff valve P4 such as a further pinch valve is disposed in pressurization line 118. The valve is pressure actuated by a branch line 122 from line 110 to the bypass shutoff valve P3. Thus the valve controls further selectively open the pressurization shutoff valve when the bypass shutoff valve is open and closes the pressurization shutoff valve when the bypass shutoff valve is closed.

Figure 3:
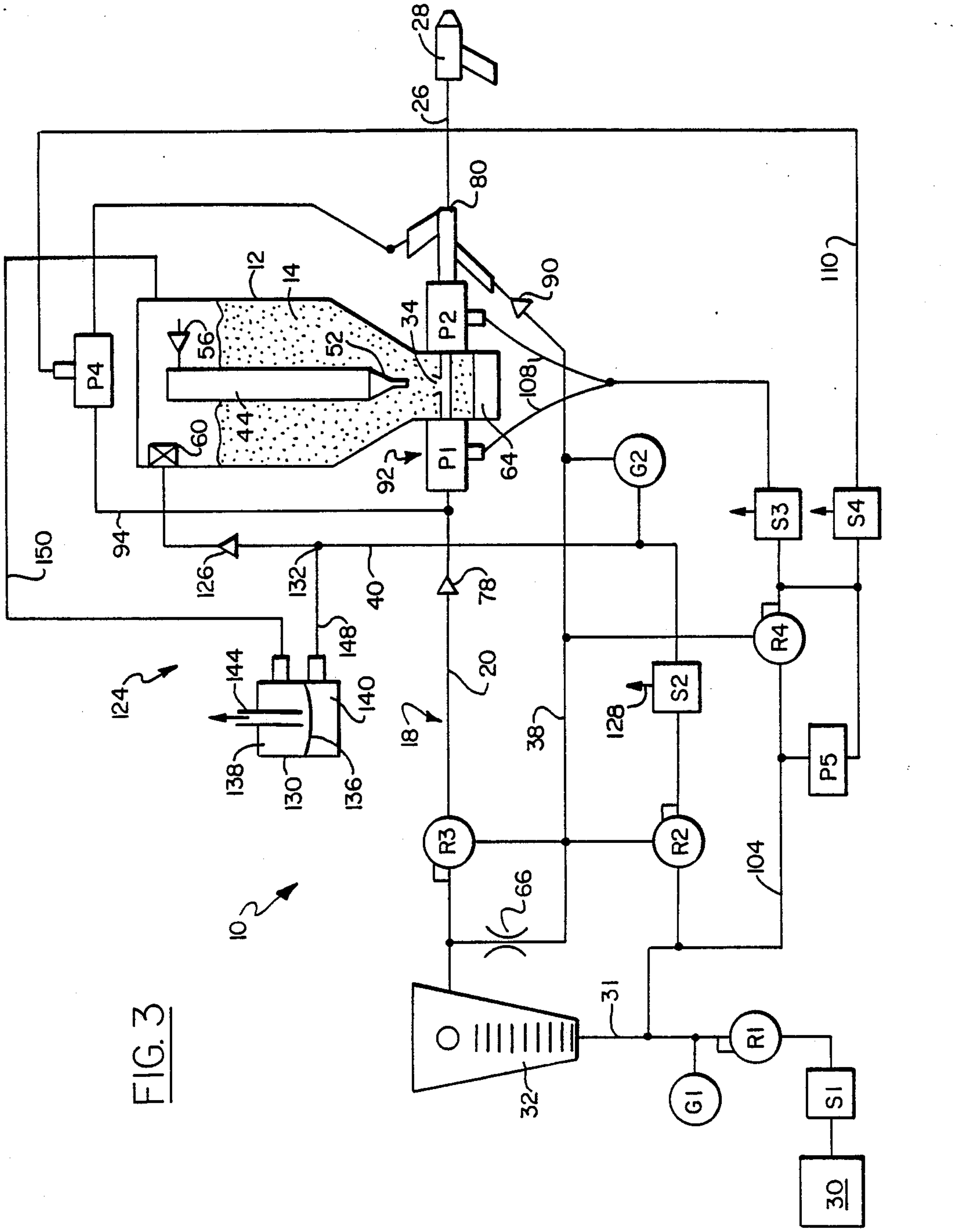
FIG. 3 is a schematic diagram of a second embodiment of a powder feeding system according to the present invention.
Figure 4:
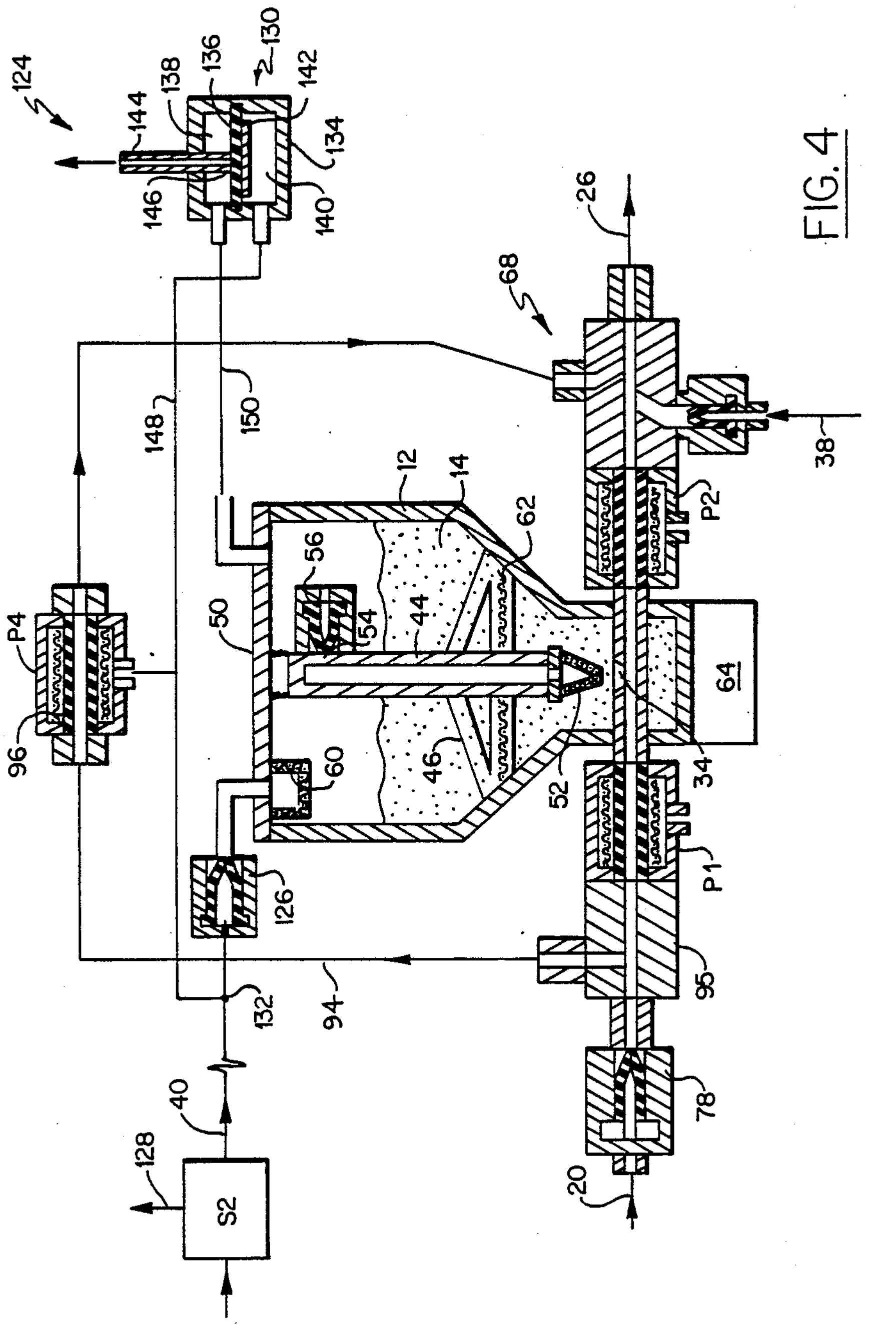
FIG. 4 is an elevation in cross-section of certain components of the system of FIG. 3.

According to another embodiment, shown in FIGS. 3 and 4, the hopper pressurization line and valve are replaced by an exhaust system 124 for exhausting gas from the hopper when powder feeding is terminated. A check valve 126 such as an elastomer duckbill is disposed in feed gas line 140 for preventing or at least impeding gas and powder flow from the hopper from backing through the feed gas line. Solenoid shutoff valve S2 relieves pressure from the feed gas line to atmosphere through relief port 128 when valve S2 is closed, as described above for valves S3 and S4. A differential exhaust valve 130 is responsive of feed gas pressure in feed gas line 40 taken from a pressure tap 132 located between check valve 126 and shutoff valve S2, such as to exhaust gas from the hopper whenever the hopper pressure exceeds the feed gas pressure. Otherwise the components are essentially the same as in FIGS. 1 and 2, and numeral designations are duplicated.

In a desirable configuration (FIG. 4) the differential exhaust valve comprises a hollow body 134 and a flexible diaphragm 136 mounted in the body to separate a first cavity 138 and a second cavity 140 therein. A rigid disk 142 somewhat smaller than diaphragm 136 and secured thereto with adhesive provides some support while allowing the flexibility. An open tubular member 144 extends into body 134 through first cavity 138 to a point 146 adjacent the diaphragm such as to normally be sealed thereby. A gas connecting line 148 is connected between second cavity 140 and pressure tap 132. An exhaust conduit 150 is connected between hopper 12 and first cavity 138. The system otherwise is the same as described for FIGS. 1 and 2 and the same component numeral designations are applicable. If the feeding system is operated at below atmosphere pressures, a vacuum pump or the like may be connected to all exhausting lines such as lines 128, 144.

In operation a pressure in first cavity 138 greater than a pressure in second cavity 140 moves diaphragm 136 away from tubular member 144 to allow gas to exhaust from the hopper through the first cavity. Conversely a pressure in the first cavity substantially equal to or less than the pressure in the second cavity closes the diaphragm against the tube, preventing the first cavity from exhausting the hopper.

Figure 5:
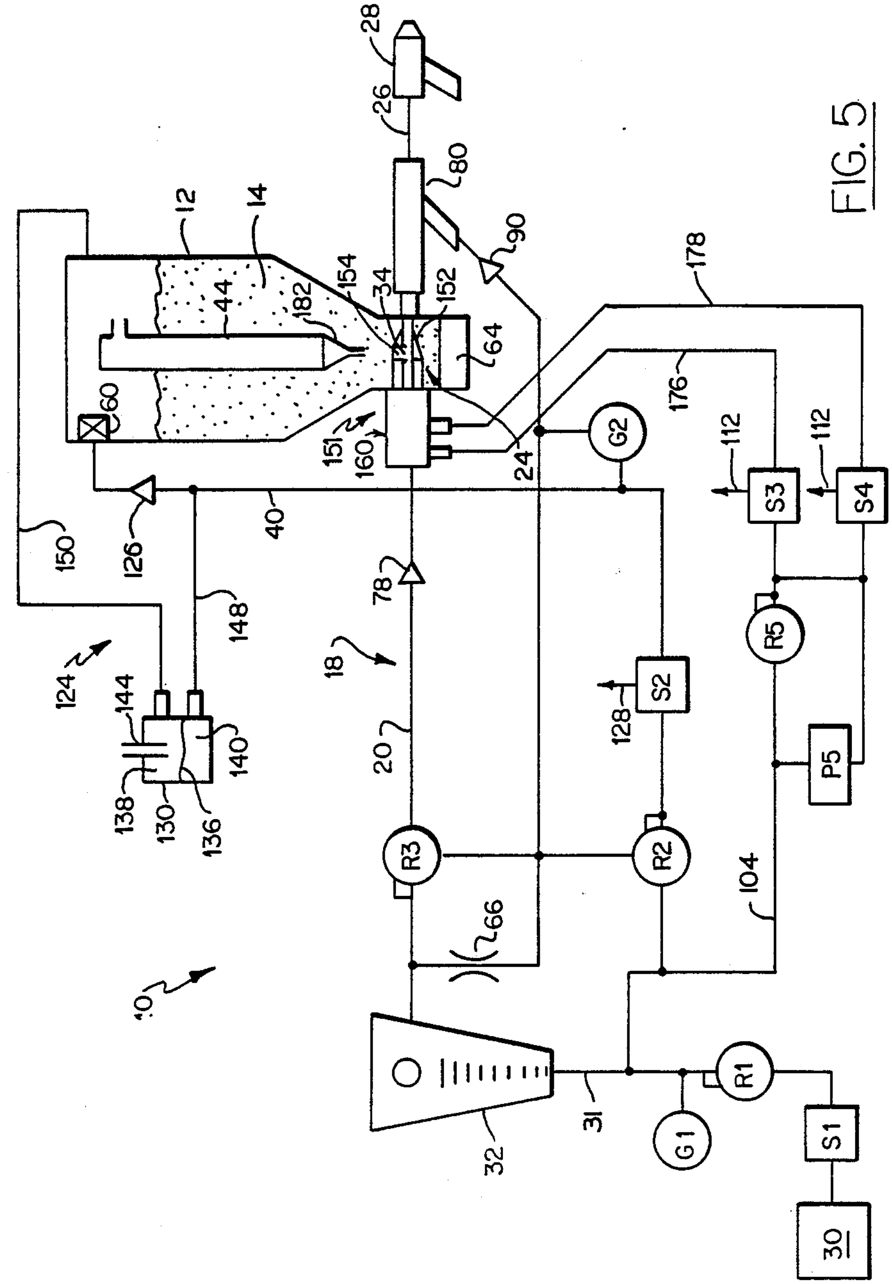
FIG. 5 is a schematic diagram of a third embodiment of a powder feeding system according to the present invention.
Figure 6:
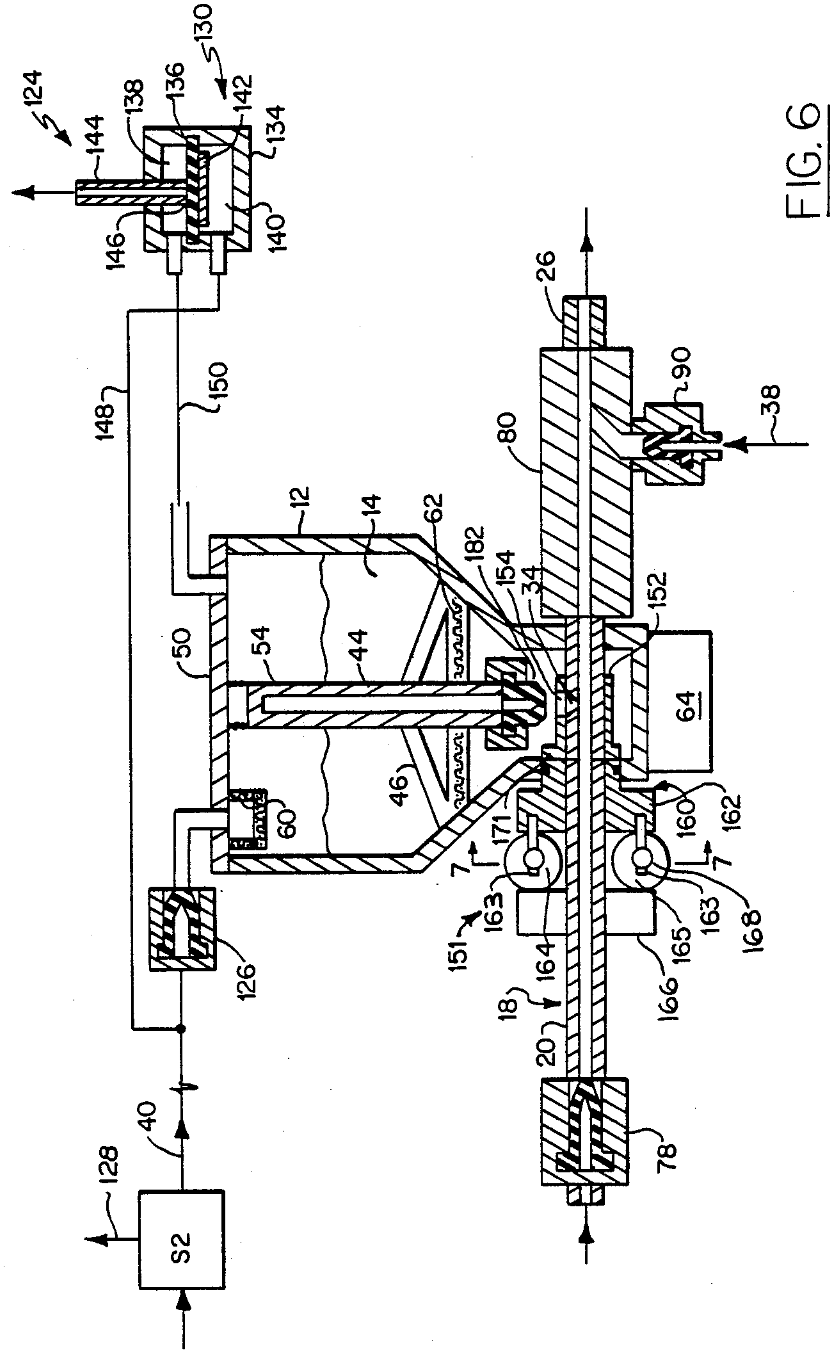
FIG. 6 is an elevation in cross-section of certain components of the system in FIG. 5.
Figure 7:
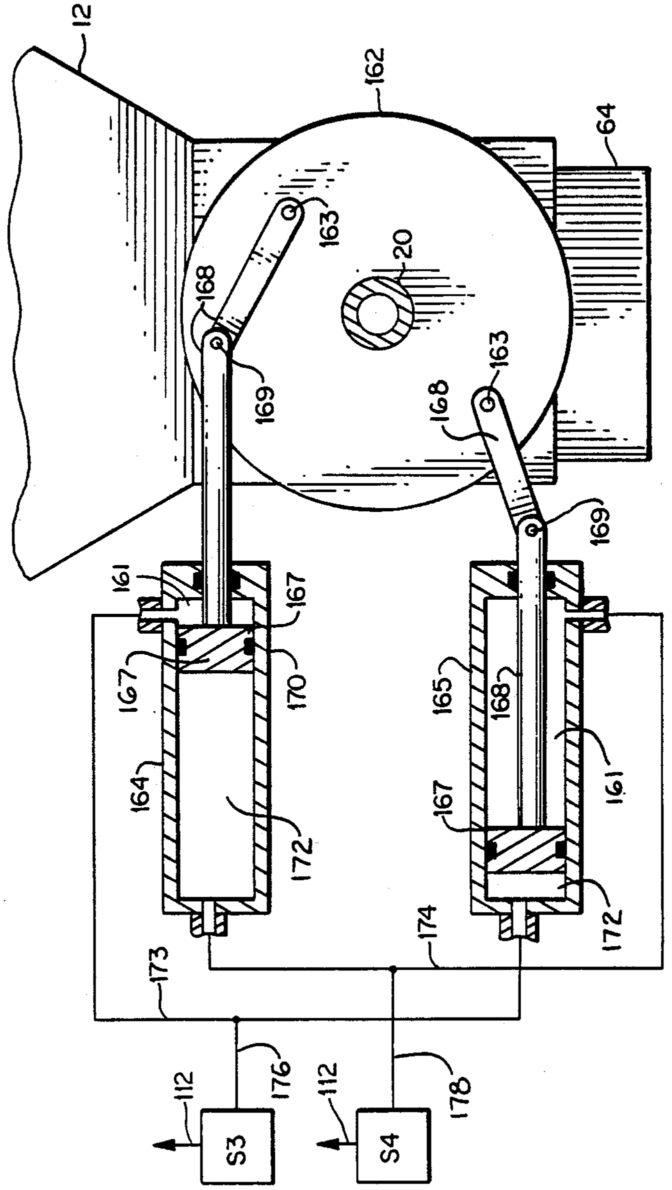
FIG. 7 is a cross-section taken at 7—7 of FIG. 6.

In yet another embodiment the valve means comprises closure means for selectively closing off the carrier conduit at the entrainment location from entraining powder from the hopper . In this embodiment, a preferred example being shown in FIGS. 5–7, the first and second carrier gas shutoff valves are omitted and replaced by closure means for closing off orifice 34 from the hopper. The bypass conduit, the hopper pressurization line and associated valves of FIGS. 1–4 are omitted. An ordinary pressure regulator R5 replaces differential regulator R4. The system otherwise is the same as described for FIGS. 3 and 4 and has the same component numeral designations applicable.

Carrier conduit 18 has powder entrainment orifice 34 therein receptive of powder at the powder entrainment location. A closure means 151 comprises a sleeve 152 disposed on carrier conduit 18 at the powder entrainment location. The tight fitting sleeve is rotatable on the powder conduit, the sleeve being made, for example, of PTFE plastic. The sleeve has an opening 154 therein alignable with the entrainment orifice 34 in an open position (shown) and rotatable to a non-aligned closed position 158 with the sleeve covering the orifice. A sleeve extension assembly 160 extends through hopper 12 with one or two 0-ring seals 171 (one shown). Outside the hopper a flange 162 on extension 160 has diametrically placed pivot pins 163. A pair of cylinders 164,165 mounted on a block 166 have pistons 167 therein with connecting rods 168 with knee joints 169 to the respective pivot pins 163. The pistons have further 0-ring seals 170 separating an inner chamber 161 and an outer chamber 172 in each cylinder. A first gas line 173 is made with a "T" connection to a line 167 from solenoid valve S3, and provide gas to inner chamber 161 of first cylinder 164 and outer chamber 172 of second cylinder 165. A second gas line connection 174 is similarly made from a line 178 and valve S4 to the outer chamber 172 of first cylinder 164 and the inner chamber 161 of second cylinder 165.

Valve gas is selectively applied to chambers 161,172. The first and second valve gas pressures are applied alternatively to the respective first and second chambers so as to selectively rotate the sleeve between the open position (shown) and the closed position.

Screen 52 (FIGS. 1–4) at the bottom of vertical tube 44 may be replaced (in FIGS. 5 and 6) by a duckbill valve 182 to keep powder out of the tube and there is no duckbill at intake port 54.

Operations of the several embodiments described above are generally similar, and the system is adapted particularly to feeding into a thermal spray gun having a high back pressure such as 50 psig. For example, with reference to the embodiment of FIGS. 1 and 2, in the ready mode with the gun not operating, solenoid valves SI,S3 are open and solenoid valves S2,S4 are closed, so that first and second carrier shutoff valves P1,P2 are closed and bypass and pressurization shutoff valves P3,P4 are open.

In this ready mode, carrier gas passes from source 30 at, e.g. 12.3 kg/cm$^2$ (175 psig), through open solenoid valve S1 into regulator R1 which is set for 8.75 kg/cm$^2$ (125 psig) output. Flowmeter 32 throttles the carrier flow at a desired rate such as 9.4 1/min (20 scfh) and maintains carrier flow through any normal range of backpressures from gun 28 such as up to 7 kg/cm$^2$ (100 psig). Relief valve R3 is set to provide (e.g.) a 2.1 kg/cm$^2$ (30 psi) backpressure above the carrier pressure in input conduit 20. The 2.1 kg/cm$^2$ ensures positive flow through restrictor 66 which feeds gas through the gas bleeder line 38. Feed regulator R3 is preset for, (e.g.) a 0.2 kg/cm$^2$ (3 psi) pressure increment according to the desired powder feed rate.

When the gun is lit a back pressure of, for example 3.5 kg/cm$^2$ (50 psig) rapidly develops in output conduit 26 through to input conduit 90. The 8.75 kg/cm$^2$ input through flowmeter 32 maintains carrier gas flow to the gun. Relief valve R3 is piloted immediately and automatically to 5.6 kg/cm$^2$ (80 psig) to maintain bleeder flow in line 38. Since the hopper is initially at about atmospheric pressure hopper 12 is rapidly pressurized by carrier gas from bypass conduit 94 and by gas backed from output conduit 26, both flowing through hopper pressurization line 118 into the hopper. The backpressure in bleeder line 38 also pilots regulator R4 to 3.7 kg/cm$^2$ (53 psig) although there is no feed gas flow through closed solenoid valve S3 yet. Once pressure in the hopper reaches the backpressure, carrier gas again flows through the output conduit.

In the feed mode solenoid valve S3 is closed and solenoid valves S3,S4 are opened, so that carrier shutoff valves P1,P2 open and bypass and pressurization valves P3,P4 close. Feed gas flows to hopper 12 and thence through vertical tube 44 and also perhaps partially through the powder 14 in the hopper to the entrain powder through pickup orifice 34. The feed gas pressure differential over the backpressure determines feed rate, which may be monitored with gauge G2. Regulator R2 may be readjusted to adjust the powder feed rate.

To stop feeding, solenoid valve 53 is opened and solenoid valves S2,S4 are closed, so that carrier shutoff valves P1,P2 close and bypass valve P3 and pressurization valve P4 open. Feed gas flow stops and the incremental hopper pressure is released through line 112 from valve S3 until gun backpressure is equalized. When the gun is turned off hopper gas further equalizes through pressurization line 118, output conduit 26 and gun 28.

The embodiment of FIGS. 3 and 4 operates similarly except that solenoid valve S2 may be opened initially along with supply valve S1 for the ready mode, since no feed gas flow can occur with valves closed. When the gun is lit the various pressures adjust including full pressurization of the hopper at 3.7 kg/cm$^2$ from feed line 40. Since pressures are balanced in cavities 138,140 of differential exhaust valve 130 the hopper is not exhausted at this stage.

In the feed mode for FIGS. 3 and 4 solenoid valve S3 is closed and solenoid valve S4 is opened, so that carrier shutoff valves P1,P2 open and bypass valve P4 closes. Powder feed commences essentially instantly because of the preliminary pressurization, which is a particular advantage of this embodiment. The valve settings are reversed for stopping feed with the gun still lit. Any excess pressure in the hopper over feed line pressure causes differential valve 130 to open and exhaust the hopper until it equalizes to the feed gas pressure. When the feeder is shut down solenoid valve 52 is turned off so that feed line 40 exhausts through the line 128 from valve S2 to atmospheric pressure, allowing the exhaust valve to similarly exhaust the hopper. This type of exhaust valve is better than a solenoid operated pinch valve because exhausting will automatically occur whenever the hopper pressure exceeds feed line pressure even during operation, resulting in quick readjustments of feed rate as needed.

The embodiment of FIGS. 4–7 is operated the same as that of FIGS. 3 and 4. Solenoids S3,S4 actuate powder closure valve 151 instead of the carrier pinch valves replaced, and no carrier bypass is necessary because carrier gas can flow through the carrier conduit with the closure valve open or closed. The exhaust valve operates as for FIG. 2. This embodiment eliminates a slug of powder that may lodge in the entrainment section between pinch valves.

It may be seen from the foregoing descriptions that the present invention provides a powder feeding system for a thermal spray gun or the like that produces a high backpressure into the powder carrier gas conduit. As the gun and backpressure are turned on and off, and as the backpressure may vary with gun adjustments, the feeding system automatically and quickly adjusts its internal pressures to maintain an accurate powder feed rate. The several embodiments have specific advantages as indicated. The system is not restricted to backpressures above atmospheric, and may be utilized for applications such as plasma spraying in low pressure chambers.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A powder feeding system useful for feeding powder to a thermal spray gun susceptible of producing substantial changes in back pressure to the feeding system, comprising, in combination:

an enclosed hopper for a powder;

carrier conduit means for conveying the powder in a carrier gas stream from a powder entrainment location in the hopper to a powder utilization device;

entrainment means for discharging a feed gas into the hopper at a regulated pressure such as to effect entrainment of the powder into the carrier gas stream at the entrainment location at a feed rate responsive to the regulated pressure;

hopper pressure means for pressurizing the hopper before feeding powder and exhausting the hopper after feeding powder;

detection means for detecting carrier gas pressure in the carrier conduit mean and;

feed regulator means responsive to the carrier gas pressure for effecting the regulated pressure equal to the carrier gas pressure increased by a selected feed pressure increment.

2. A powder feeding system according to claim 1 wherein the feed regulator means is a differential pressure regulator having a reference pressure inlet in gas pressure communication with the carrier conduit means.

3. A powder feeding system according to claim 1 wherein the entrainment means includes a feed gas line disposed between the regulator means and the hopper, and further includes a first gas shutoff valve disposed in the feed gas line.

4. A powder feeding system useful for feeding powder to a thermal spray gun susceptible of producing substantial changes in back pressure to the feeding system, comprising, in combination:

an enclosed hopper for a powder;

carrier conduit means for conveying the powder in a carrier gas stream from a powder entrainment location in the hopper to a powder utilization device;

entrainment means for discharging a feed gas into the hopper at a regulated pressure such as to effect entrainment of the powder into the carrier gas stream at the entrainment location at a feed rate responsive to the regulated pressure;

hopper pressure means for pressurizing the hopper before feeding powder and exhausting the hopper after feeding powder;

detection means for detecting carrier gas pressure in the carrier conduit means;

feed regulator means responsive to the carrier gas pressure for effecting the regulated pressure equal to the carrier gas pressure increased by a selected feed pressure increment;

wherein the carrier conduit means includes an input conduit receptive of a carrier gas supply and extending to the entrainment location, and an output conduit extending from the entrainment location to the point of powder utilization, and wherein the detection means comprises a gas bleeder line having a constricted flow input and having an outlet connection to the output conduit such as to provide a continuous bleeding of gas through the bleeder line to the output conduit, the bleeder line having a line pressure representative of the carrier gas pressure in the output conduit, and the regulator means being responsive to the line pressure for effecting the regulated pressure.

5. A powder feeding system according to claim 4 wherein the system further comprises bleed supply means communicating with the input conduit for providing a bleed gas supply to the constricted flow input at a bleed supply pressure equal to carrier gas pressure in the input conduit increased by a selected bleed pressure increment.

6. A powder feeding system according to claim 5 wherein the bleed supply means comprises a gas input line between the carrier gas supply and the input conduit, and a regulated relief valve disposed between the input line and the input conduit such as to provide the bleed supply pressure in the input line, and the constricted flow input is connected between the input line and the gas bleeder line.

7. A powder feeding system useful for feeding powder to a thermal spray gun susceptible of producing substantial changes in back pressure to the feeding system, comprising, in combination:

an enclosed hopper for a powder;

carrier conduit means for conveying the powder in a carrier gas stream from a powder entrainment location in the hopper to a powder utilization device;

entrainment means for discharging a feed gas into the hopper at a regulated pressure such as to effect entrainment of the powder into the carrier gas stream at the entrainment location at a feed rate responsive to the regulated pressure;

hopper pressure means for pressurizing the hopper before feeding powder and exhausting the hopper after feeding powder; and detection means for detecting carrier gas pressure in the carrier conduit means;

feed regulator means responsive to the carrier gas pressure for effecting the regulated pressure equal to the carrier gas pressure increased by a selected feed pressure increment;

valve means associated with the entrainment location, the valve means having an open position for allowing the powder entrainment and a closed position for preventing the powder entrainment;

wherein the carrier conduit means includes an input conduit receptive of a carrier gas ;supply and extending to the entrainment location, and an output conduit extending from the entrainment location to the point of powder ;utilization, and wherein the valve means comprises a first carrier gas shutoff valve disposed in the input conduit proximate the entrainment location, a second carrier gas shutoff valve disposed in the output conduit proximate the entrainment location, a carrier bypass conduit connected between the input conduit and the output conduit to bypass the entrainment location and the carrier shutoff valves, a bypass shutoff valve disposed in the bypass conduit, and valve control means for selectively opening and closing the shutoff valves such that the first and second carrier gas shutoff valves are opened and closed jointly and the bypass shutoff valve is open when the carrier gas shutoff valves are closed and the bypass ;shutoff valve is closed when the carrier gas shutoff valves are open.

8. A powder feeding system according to claim 7 wherein the shutoff valves each comprises an elastomer pinch valve operated by valve gas pressure from a respective valve pressure source.

9. A powder feeding system according to claim 8 wherein the valve pressure source comprises valve regulator means responsive to the carrier gas pressure for effecting the valve pressure equal to the carrier gas pressure increased by a selected valve pressure increment sufficient to operate the carrier gas shutoff valves, the valve control means comprises carrier gas shutoff means disposed to selectively apply the valve gas pressure to the carrier gas shutoff valves, and the valve control means further comprises bypass gas shutoff means disposed to selectively apply the valve gas pressure to the bypass shutoff valve.

10. A powder feeding system according to claim 7 wherein the hopper pressure means comprises a hopper pressurization line connected between the output conduit and the hopper above a maximum powder level therein, and a pressurization shutoff valve disposed in the pressurization line, wherein the valve control means further selectively opens the pressurization shutoff valve when the bypass shutoff valve is open and closes the pressurization shutoff valve when the bypass shutoff valve is closed.

11. A powder feeding system according to claim 10 wherein the shutoff valves each comprises an elastomer pinch valve operated by valve gas pressure from a respective valve pressure source.

12. A powder feeding system according to claim 11 wherein the valve pressure source comprises valve regulator means responsive to the carrier gas pressure for effecting the valve pressure equal to the carrier gas pressure increased by a selected valve pressure increment sufficient to operate the first and second shutoff valves, the valve control means comprises carrier gas shutoff means disposed to selectively apply the valve gas pressure to the first and second powder shutoff valves, and the valve control means further comprises bypass gas shutoff means disposed to selectively apply the valve gas pressure to the bypass shutoff valve and the pressurization shutoff valve.

13. A powder feeding system according to claim 7 wherein the hopper pressure means comprises exhaust means for exhausting gas from the hopper when powder feeding is terminated.

14. A powder feeding system according to claim 13 wherein the entrainment means includes a feed gas line disposed between the regulator means and the hopper, and further includes a first gas shutoff valve disposed in the feed gas line, and the exhaust means comprises a check valve disposed in the feed gas line for impeding gas flow from the hopper through the feed gas line, pressure relief means disposed between the shutoff valve and the check valve for relieving pressure from the feed gas line when the first shutoff valve is closed, and a differential exhaust valve responsive of hopper pressure and of feed gas pressure in the feed gas line at a pressure tap located between the hopper and the first shutoff valve, such as to exhaust gas from the hopper through the differential exhaust valve when hopper pressure exceeds the feed gas pressure.

15. A powder feeding system according to claim 14 wherein the differential exhaust valve comprises a hollow body, a flexible diaphragm mounted in the body to separate a first cavity and a second cavity therein, an open tubular member extending into the body through the first chamber to a point adjacent the diaphragm such as to normally be sealed thereby, a gas connecting line connected between the second cavity and the pressure tap, and an exhaust conduit connected between the hopper and the first cavity, whereby a pressure in the first cavity greater than a pressure in the second chamber moves the diaphragm away from the tubular member to exhaust gas through the first cavity, and a pressure in the first cavity substantially equal to or less than a pressure in the second cavity closes the first cavity from exhausting.

16. A powder feeding system according to claim 14 wherein the check valve comprises an elastomer duckbill valve.

17. A powder feeding system useful for feeding powder to a thermal spray gun susceptible of producing substantial changes in back pressure to the feeding system, comprising, in combination:

an enclosed hopper for a powder;

carrier conduit means for conveying the powder in a carrier gas stream from a powder entrainment location in the hopper to a powder utilization device;

entrainment means for discharging a feed gas into the hopper at a regulated pressure such as to effect entrainment of the powder into the carrier gas stream at the entrainment location at a feed rate responsive to the regulated pressure;

hopper pressure means for pressurizing the hopper before feeding powder and exhausting the hopper after feeding powder; and detection means for detecting carrier gas pressure in the carrier conduit means;

feed regulator means responsive to the carrier gas pressure for effecting the regulated pressure equal to the carrier gas pressure increased by a selected feed pressure increment;

valve means associated with the entrainment location, the valve means having an open position for allowing the powder entrainment and a closed position for preventing the powder entrainment;

wherein the valve means comprises closure means for selectively closing off the carrier conduit means from entraining powder from the hopper at the entrainment location.

18. A powder feeding system according to claim 17 wherein the carrier conduit includes a conduit portion with a powder entrainment orifice therein receptive of powder at the powder entrainment location, and the closure means comprises a rotatable sleeve disposed on the carrier conduit at the powder entrainment location and further comprises rotating means for rotating the sleeve on the powder conduit, the sleeve having a side opening therein alignable with the entrainment orifice in an open position and rotatable to a non-aligned closed position.

19. A powder feeding system according to claim 17 wherein the hopper pressure means comprises exhaust means for exhausting gas from the hopper when powder feeding is terminated.

20. A powder feeding system according to claim 19 wherein the entrainment means includes a feed gas line disposed between the regulator means and the hopper, and further includes a first gas shutoff valve disposed in the feed gas line, and the exhaust means comprises a check valve disposed in the feed gas line for impeding gas flow from the hopper through the feed gas line, pressure relief means disposed between the shutoff valve and the check valve for relieving pressure from the feed gas line when the first shutoff valve is closed, and a differential exhaust valve responsive of hopper pressure and feed gas pressure in the feed gas line at a pressure tap located between the hopper and the first shutoff valve such as to exhaust gas from the hopper through the differential exhaust valve when hopper pressure exceeds the feed gas pressure.

21. A powder feeding system according to claim 20 wherein the differential exhaust valve comprises a hollow body, a flexible diaphragm mounted in the body to separate a first cavity and a second cavity therein, an open tubular member extending into the body through the first chamber to a point adjacent the diaphragm such as to normally be sealed thereby, a gas connecting line connected between the second cavity and the pressure tap, and an exhaust conduit connected between the hopper and the first cavity, whereby a pressure in the first cavity greater than a pressure in the second chamber moves the diaphragm away from the tubular member to exhaust gas through the first cavity, and a pressure in the first cavity substantially equal to or less than a pressure in the second cavity closes the first cavity from exhausting.

22. A powder feeding system according to claim 20 wherein the check valve comprises an elastomer duck-bill valve.

23. A powder feeding system useful for feeding powder to a thermal spray gun susceptible of producing substantial changes in back pressure to the feeding system, comprising, in combination:

an enclosed hopper for a powder;

carrier conduit means for conveying the powder in a carrier gas stream from a powder entrainment location in the hopper to a powder utilization device;

entrainment means for discharging a feed gas into the hopper at a regulated pressure such as to effect entrainment of the powder into the carrier gas stream at the entrainment location at a feed rate responsive to the regulated pressure;

hopper pressure means for pressurizing the hopper before feeding powder and exhausting the hopper after feeding powder;

detection means for detecting carrier gas pressure in the carrier conduit means; and feed regulator means responsive to the carrier gas pressure for effecting the regulated pressure equal to the carrier gas pressure increased by a selected feed pressure increment;

wherein the entrainment means comprises a vertical tube mounted in the hopper such as to extend from a first point above a maximum powder level in the hopper to a second point proximate the powder entrainment location, and valve means mounted on the tube for preventing powder from passing upwardly through the tube, the tube having an intake orifice therein above the maximum powder level receptive of feed gas from the hopper.

24. A powder feeding system according to claim 23 wherein the blocking means comprises a screen located at the first point, and the entrainment means further comprises an elastomer duck-bill valve disposed at the intake orifice to prevent gas from flowing upwardly through the tube.

25. A powder feeding system including an enclosed hopper for a powder, carrier conduit means for conveying the powder in a carrier gas stream from a powder entrainment location in the hopper to a point of powder utilization, entrainment means for discharging a feed gas into the hopper at a regulated pressure such as to effect entrainment of the powder into the carrier gas at the entrainment location, and exhaust means for exhausting gas from the hopper when powder feeding is terminated, the entrainment means comprising a feed gas line disposed between the regulator means and the hopper and further comprising a first gas shutoff valve disposed in the feed gas line, and the exhaust means comprising a check valve disposed in the feed gas line for impeding gas flow from the hopper through the feed gas line, pressure relief means disposed between the shutoff valve and the check valve for relieving pressure from the feed gas line when the first gas shutoff valve is closed, and a differential exhaust valve responsive of hopper pressure and feed gas pressure in the feed gas line at a pressure tap located between the hopper and the first shutoff valve, such as to exhaust gas from the hopper through the differential exhaust valve when hopper pressure exceeds the feed gas pressure.

26. A powder feeding system according to claim 25 wherein the differential exhaust valve comprises a hollow body, a flexible diaphragm mounted in the body to separate a first cavity and a second cavity therein, an open tubular member extending into the body through the first chamber to a point adjacent the diaphragm such as to normally be sealed thereby, a gas connecting line connected between the second cavity and the pressure tap, and an exhaust conduit connected between the hopper and the first cavity, whereby a pressure in the first cavity greater than a pressure in the second chamber moves the diaphragm away from the tubular member to exhaust gas through the first cavity, and a pressure in the first cavity substantially equal to or less than a pressure in the second cavity closes the first cavity from exhausting.

27. A powder feeding system according to claim 25 wherein the check valve comprises an elastomer duck-bill valve.

28. A powder feeding system useful for feeding powder to a thermal spray gun susceptible of producing substantial changes in back pressure to the feeding system, comprising, in combination:

an enclosed hopper for a powder;

a carrier conduit for conveying the powder in a carrier gas stream from an orifice in the carrier conduit at a powder entrainment location in the hopper to a powder utilization device, the carrier conduit means including an input conduit receptive of a carrier gas supply and extending to the entrainment location, and an output conduit extending from the entrainment location to the powder utilization device;

entrainment means for discharging a feed gas into the hopper at a regulated pressure such as to effect entrainment of the powder into the carrier gas stream at the entrainment location at a feed rate responsive to the regulated pressure, the entrainment means including a feed gas line disposed between the regulator means and the hopper, and further including a first gas shutoff valve disposed in the feed gas line;

valve means for allowing or preventing powder entrainment, comprising a first carrier gas shutoff valve disposed in the input conduit proximate the entrainment location, a second carrier gas shutoff valve disposed in the output conduit proximate the entrainment location, a carrier bypass conduit connected between the input conduit and the output conduit to bypass the entrainment location and the carrier shutoff valves, a bypass shutoff valve disposed in the bypass conduit, and valve control means for selectively opening and closing the shutoff valves such that the first and second carrier gas shutoff valves are opened and closed jointly and the bypass shutoff valve is open when the carrier gas shutoff valves are closed and the bypass shutoff valve is closed when the carrier gas shutoff valves are open;

a hopper pressurization line connected between the output conduit and the hopper above a maximum powder level therein, and a pressurization shutoff valve disposed in the pressurization line, wherein the valve control means further selectively opens the pressurization shutoff valve when the bypass shutoff valve is open and closes the pressurization shutoff valve when the bypass shutoff valve is closed;

detection means for detecting carrier gas pressure in the carrier conduit means, comprising a gas bleeder line having a constricted flow input and having an outlet connection to the output conduit such as to provide a continuous bleeding of gas through the bleeder line to the output conduit, the bleeder line having a line pressure representative of the carrier gas pressure in the output conduit, and the regulator means being responsive to the line pressure for effecting the regulated pressure;

a bleed supply comprising a gas input line disposed between the carrier gas supply and the input conduit, and a regulated relief valve disposed between the input line and the input conduit such as to provide a bleed supply pressure in the input line equal to carrier gas pressure in the input conduit increased by a selected bleed pressure increment, the constricted flow input being connected between the input line and the gas bleeder line; and a differential pressure regulator having a reference pressure inlet in gas pressure communication with the carrier conduit for effecting the regulated pressure equal to the carrier gas pressure increased by a selected feed pressure increment.

29. A powder feeding system useful for feeding powder to a thermal spray gun susceptible of producing substantial changes in back pressure to the feeding system, comprising, in combination:

an enclosed hopper for a powder;

a carrier conduit for conveying the powder in a carrier gas stream from an orifice in the carrier conduit at a powder entrainment location in the hopper to a powder utilization device, the carrier conduit means includes an input conduit receptive of a carrier gas supply and extending to the entrainment location, and an output conduit extending from the entrainment location to the powder utilization device; entrainment means for discharging a feed gas into the hopper at a regulated pressure such as to effect entrainment of the powder into the carrier gas stream at the entrainment location at a feed rate responsive to the regulated pressure, the entrainment means including a feed gas line disposed between the regulator means and the hopper, and further including a first gas shutoff valve disposed in the feed gas line;

valve means for allowing or preventing powder entrainment, comprising a first carrier gas shutoff valve disposed in the input conduit proximate the entrainment location, a second carrier gas shutoff valve disposed in the output conduit proximate the entrainment location, a carrier bypass conduit connected between the input conduit and the output conduit to bypass the entrainment location and the carrier shutoff valves, a bypass shutoff valve disposed in the bypass conduit, and valve control means for selectively opening and closing the shutoff valves such that the first and second carrier gas shutoff valves are opened and closed jointly and the bypass shutoff valve is open when the carrier gas shutoff valves are closed and the bypass shutoff valve is closed when the carrier gas shutoff valves are open;

hopper pressure means comprising exhaust means for exhausting gas from the hopper when hopper pressure exceeds feed gas line pressure, comprising a check valve disposed in the feed gas line between the shutoff valve and the hopper for impeding gas flow from the hopper through the feed gas line, pressure relief means disposed between the shutoff valve and the check valve for relieving pressure from the feed gas line when the first shutoff valve is closed, and a differential exhaust valve responsive of hopper pressure and of feed gas pressure in the feed gas line at a pressure tap located between the check valve and the first shutoff valve;

detection means for detecting carrier gas pressure in the carrier conduit means, comprising a gas bleeder line having a constricted flow input and having an outlet connection to the output conduit such as to provide a continuous bleeding of gas through the bleeder line to the output conduit, the bleeder line having a line pressure representative of the carrier gas pressure in the output conduit, and the regulator means being responsive to the line pressure for effecting the regulated pressure;

a bleed supply comprising a gas input line disposed between the carrier gas supply and the input conduit, and a regulated relief valve disposed between the input line and the input conduit such as to provide a bleed supply pressure in the input line equal to carrier gas pressure in the input conduit increased by a selected bleed pressure increment, the constricted flow input being connected between the input line and the gas bleeder line; and a differential pressure regulator having a reference pressure inlet in gas pressure communication with the carrier conduit for effecting the regulated pressure equal to the carrier gas pressure increased by a selected feed pressure increment.

30. A powder feeding system useful for feeding powder to a thermal spray gun susceptible of producing substantial changes in back pressure to the feeding system, comprising, in combination:

an enclosed hopper for a powder;

a carrier conduit for conveying the powder in a carrier gas stream from an orifice in the carrier conduit at a powder entrainment location in the hopper to a powder utilization device, the carrier conduit means includes an input conduit receptive of a carrier gas supply and extending to the entrainment location, and an output conduit extending from the entrainment location to the powder utilization device;

entrainment means for discharging a feed gas into the hopper at a regulated pressure such as to effect entrainment of the powder into the carrier gas stream at the entrainment location at a feed rate responsive to the regulated pressure, the entrainment means including a feed gas line disposed between the regulator means and the hopper, and further including a first gas shutoff valve disposed in the feed gas line;

a rotatable sleeve disposed on the carrier conduit at the powder entrainment location, rotating means for rotating the sleeve on the powder conduit, the sleeve having a side opening therein alignable with the entrainment orifice in an open position and rotatable to a non-aligned closed position;

hopper pressure means comprising exhaust means for exhausting gas from the hopper when hopper pressure exceeds feed gas line pressure, comprising a check valve disposed in the feed gas line between the shutoff valve and the hopper for impeding gas flow from the hopper through the feed gas line, pressure relief means disposed between the shutoff valve and the check valve for relieving pressure from the feed gas line when the first shutoff valve is closed, and a differential exhaust valve responsive of hopper pressure and of feed gas pressure in the feed gas line at a pressure tap located between the check valve and the first shutoff valve;

detection means for detecting carrier gas pressure in the carrier conduit means, comprising a gas bleeder line having a constricted flow input and having an outlet connection to the output conduit such as to provide a continuous bleeding of gas through the bleeder line to the output conduit, the bleeder line having a line pressure representative of the carrier gas pressure in the output conduit, and the regulator means being responsive to the line pressure for effecting the regulated pressure;

a bleed supply comprising a gas input line disposed between the carrier gas supply and the input conduit, and a regulated relief valve disposed between the input line and the input conduit such as to provide a bleed supply pressure in the input line equal to carrier gas pressure in the input conduit increased by a selected bleed pressure increment, the constricted flow input being connected between the input line and the gas bleeder line; and a differential pressure regulator having a reference pressure inlet in gas pressure communication with the carrier conduit for effecting the regulated pressure equal to the carrier gas pressure increased by a selected feed pressure increment.

* * * * *

UNITED STATES PATENT OFFICE
CERTIFICATE OF CORRECTION

Patent No. 4,900,199 Dated February 13, 1990

Inventor(s) Mark F. Spaulding and Richard A. Goehring

It is certified that error appears in the above-identified patent and that said Letters Patent is hereby corrected as shown below:

In column 9, line 13, change "SI" to --S1--.

In column 11, line 7, change "mean" to --means--.

In column 12, line 32, delete the semicolon (;).

In column 12, line 35, delete the semicolon (;).

In column 12, line 49, delete the semicolon (;).

Signed and Sealed this

Seventh Day of April, 1992

*Attest:*

HARRY F. MANBECK, JR.

*Attesting Officer* *Commissioner of Patents and Trademarks*